June 25, 1963
K. NEIDHARDT
3,095,074
DEVICE FOR CONTROLLING THE MOVEMENT AND
ACCELERATION OF PIECE GOODS SLIDING
ON INCLINED TRACKS
Filed March 11, 1960
2 Sheets-Sheet 1
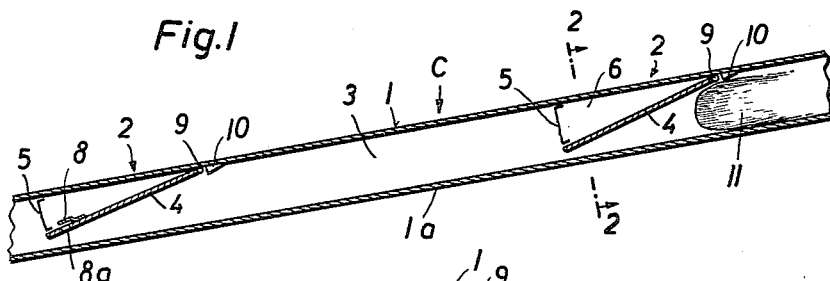
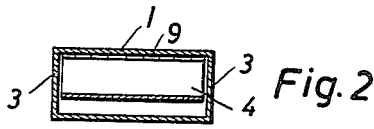
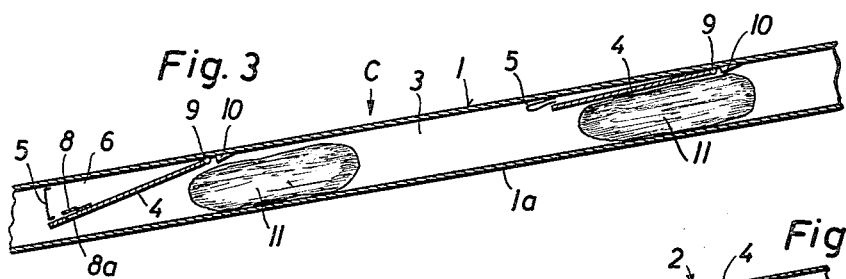
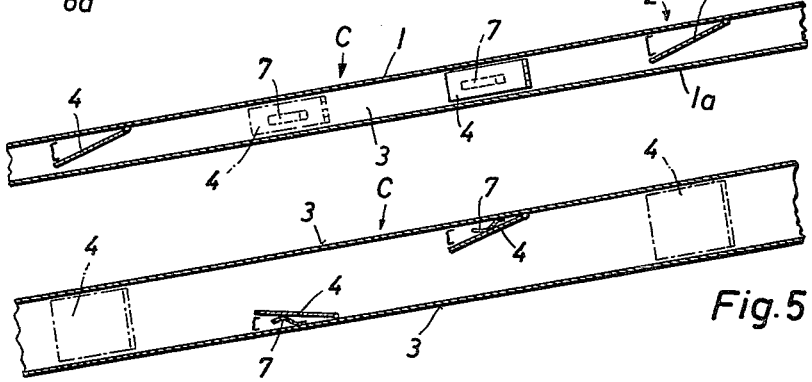
INVENTOR
Karl Neidhardt
BY
Lowry & Rinehart
ATTYS.

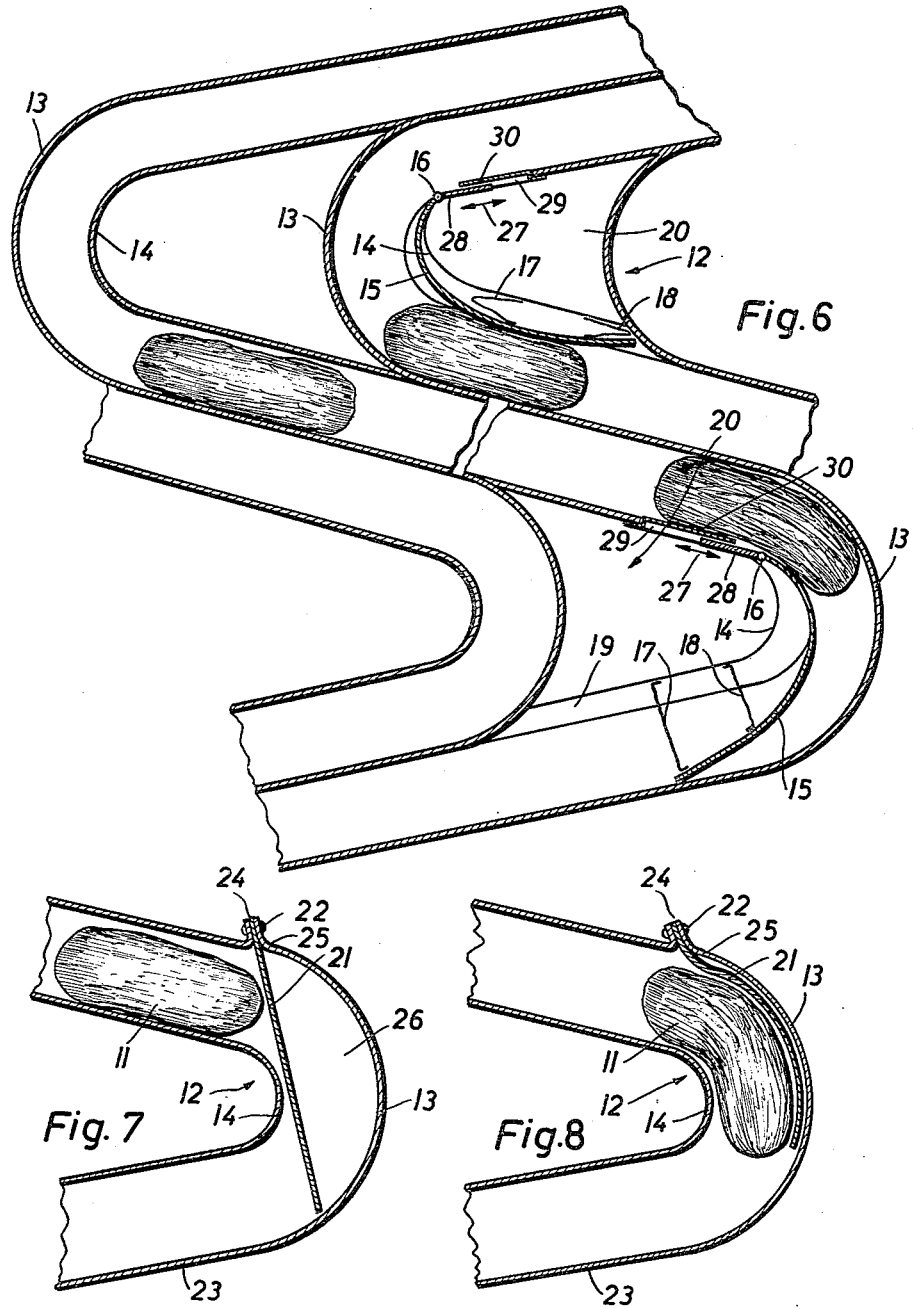

United States Patent Office 3,095,074
Patented June 25, 1963

3,095,074
DEVICE FOR CONTROLLING THE MOVEMENT AND ACCELERATION OF PIECE GOODS SLIDING ON INCLINED TRACKS
Karl Neidhardt, Cologne-Deutz, Germany, assignor to Heinr. Auer Mühlenwerke K.G.a.A., Cologne-Deutz, Germany, a firm
Filed Mar. 11, 1960, Ser. No. 14,467
Claims priority, application Germany Mar. 12, 1959
3 Claims. (Cl. 193—40)

This invention relates to a device for controlling the movement and acceleration of piece goods sliding on inclined tracks, for instance, for bag silo chutes, parcel chutes or the like.

Devices for controlling the movement and loading of piece goods on inclined tracks are known wherein the track is subdivided into sections and each section is provided with a control device, the control elements of which are operated automatically by forces produced by the weight or thrust of the goods and interact upon and control one another in the device. Such a control device comprises a pressing surface and an adhesive surface interconnected by linkage. Such control devices have very complicated mechanisms and parts and greatly increase the first costs of the complete equipment.

It is an object of the invention to improve and develop the control device for such slideways or chutes. The invention comprises a pneumatic device to reduce the acceleration of the goods (acceleration reducer or retarder), wherein a plate or the like mounted for pivoting inside the chute channel is acted upon by an air cushion. According to the invention, the plate is provided at the opening end and, if required, on the sides with a flexible foil or with a diaphragm so as to cooperate with the wall or walls of the chute channel to bound a chamber closed in substantially air-tight manner, said chamber communicating with the surroundings through reduced apertures. Advantageously, the plate takes up the width or the height of the chute channel. It is sufficient to close the said chamber at merely the opening end of the pivotable plate. The limited apertures—i.e., the air outlets—of said chamber are gaps between the plate side surfaces and the corresponding chute channel wall.

The advantage of such an acceleration reducer or retarder according to the invention is that it is simple, strong, reliable in operation and highly effective, for it consists substantially of just the bellows-like part which is disposed completely in the chute channel cross-section. The device comprises a reduced number of parts and can be inexpensively manufactured. It requires no extra space, and the chutes can therefore be placed closely above one another. The efficiency of the pneumatic device is readily controllable. Adjustment is by varying the angular position of the plate which acts as a flap. Also, retarder efficiency depends upon the impetus of the sliding goods. Retardation is gentle when the goods slide up to the acceleration reducer or retarder slowly, but the retarding force increases in proportion as the approach speed of the goods is greater.

The plate can comprise non-return valves at the air passages. Conveniently, the air chamber formed by the plate is disposed alternately heightwise and widthwise of the chute cross-section, to ensure that the goods, for instance, the bag or parcel, are not continually pressed on one side only. Consequently, the goods are not pressed flat, for instance, heightwise, by the retarders; if the goods were so pressed, they could slide all the more easily through subsequent retarders. If the retarders can be operative heightwise and transversely alternately, flattening of the goods, more particularly of bags, in one direction only is obviated. Advantageously, where the pivoting plate is placed upright, it is returned to the operative position by a spring.

The arrangement according to the invention is of use in any kind of chute, whether of the inclined-track or vertical-fall-shaft type. The retarder according to the invention can also be used with advantage in chutes which have a zigzag pattern in a vertical plane—.ie., vertical curved chutes—where the pneumatic retarders can be placed at the reversal stations of the zigzag chutes. In one very advantageous arrangement there is used instead of a rigid plate a flexible strip-like member, for instance, of sheet steel, which is disposed at the reversal station of the chute in a plane extending transversely of the curvature of the chute and which extends through the space of the chute bend and which can be pressed thereinto by the goods. In this arrangement no diaphragm is required to close the air chamber formed by the strip-like member. The same is in the form of an extended sheet when in the inoperative position.

With the above and other objects in view that will become apparent as the nature of the invention is better understood, the same consists in the novel form, combination and arrangement of parts hereinafter more fully described, shown in the accompanying drawings, and particularly claimed.

Several embodiments of the invention are illustrated in the drawings, wherein:

FIG. 1 is a vertical fragmentary longitudinal sectional view of an inclined chute with devices therein for retarding the passage of bags, parcels or the like therethrough;

FIG. 2 is a cross-section taken along the line 2—2 of FIG. 1;

FIG. 3 illustrates the chute shown in FIG. 1 but with the passage retarder elements thereof in different positions;

FIGS. 4 and 5 are vertical and horizontal sectional views, respectively showing how the pneumatic retarders according to the invention can be distributed along a relatively long portion of the chute, the said retarders being disposed alternately on the top wall and on the side walls of the chute channel, and FIGS. 6–8 show how the pneumatic retarders according to the invention can be arranged in a vertical chute, FIG. 6 illustrating one embodiment of the air-chamber forming plate at the chute reversal station, while FIGS. 7 and 8 illustrate another embodiment of the pneumatic retarder.

Referring to the embodiment illustrated in FIGS. 1–5, a straight inclined chute designated in general by the reference character C is provided at predetermined intervals with at least one pneumatic device 2 to act as a retarder to reduce the acceleration of the goods. The chute C is formed by a chute channel comprising a top closure wall 1 and side walls 3 and a bottom wall 1a. The retarder comprises a movable plate 4 and a diaphragm-like closure member 5 at the open end of the plate 4. The member 5 can consist, for instance, of an air-tight or substantially air-tight canvas. The plate 4 which pivots like a flap as at 9 on the top wall 1 occupies the whole width of the chute cross-section when the same is closed or, in case, as in FIG. 4 where the retarder is disposed on the side walls of the chute-cross section, the whole height thereof so that the plate 4 lies as a tightly fitting closure member between the chute walls. The plate 4 cooperates with the diaphragm-like member 5 to form a substantially air-tight chamber 6. A spring 7, as shown in FIGS. 4 and 5, advantageously a spring strip, returns the plate 4 automatically to its initial position. However, such a spring need be provided only when the plates are fitted to the side walls 3. To accelerate the return movement of the plate 4, the same can comprise one or more non-return valves 8, 8a, advantageously in the form of small flexible plates, for instance, of leather or the like. Advantageously, an inclined wedge-like surface 10 is provided before the pivot 9 to ensure a smooth transition to the plate 4.

The arriving goods, for instance, a bag 11, abuts the plate 4 hanging in the chute cross-section and urges the plate 4 against the wall 1 or 3 of the chute channel, the air in the chamber 6 being compressed and then slowly displaced. The goods are therefore stopped, and only when the plate 4 rests without resistance upon the bag 11 can the same start up from its stop again and slide to the next retarder. When the bag has left the retarder, the plate, if disposed on the top wall 1, drops by its own weight and is ready to deal with the next bag which arrives.

Due to the presence of the retarders, the bags or piece goods are advanced uniformly and relatively slowly and so do not knock into one another. They can therefore lie one behind another without pressure immediately after the filling of the chutes.

FIGS. 4 and 5 illustrate a convenient method of distributing the retarders relatively to one another. Conveniently, the retarders are so arranged that a first retarder acts upon the top of the goods, for instance, a bag, the next retarder acts upon the bag from one side 3 of the chute channel cross-section, and the next retarder operates from the other side 3 of the chute channel cross-section. To control the compression in the air chamber 6, the plate is formed with aperture controllable by a slide member (not shown). The retardation provided by the pneumatic retarder can readily be controlled by means of the adjustable apertures.

FIGS. 6–8 illustrate a chute 12 which descends in short zig-zag lines in a vertical plane and which is known as a vertical curved chute. At the reversal stations, adjacent chute parts 12 are interconnected by appropriate bends 13, 14. The bags are turned over as they pass through the reversal stations. Advantageously, the retarders are disposed at the reversal stations in this kind of chute. The retarder plates 15, which are pivotally mounted at 16, extend into the chute cross-section by way of a part of greater curvature than the inner curvature 14. The plates 15 are provided with flexible diaphragms 17 and 18 in a plane transverse to the direction of goods movement and can, when pressed against the top wall of the chute channel, engage in a gallery 19 which extends parallel with the chute channel and which can be disposed in the free space 20 between two reversal stations of the chute. A retarder according to the invention can be provided at every reversal station or at every other reversal station or at every third reversal station, depending upon the length of the straight parts of the chute. A chute consisting of relatively short zigzag parts in a vertical plane, the goods, for instance, bags, being conveyed by being turned over, has the advantage that it takes up very little space and enables the pneumatic retarders to be fitted readily.

The curved plate 15 lying in the vertical curved chute 12 can be made movable in the direction of the arrows 27 as in FIG. 6. Thus the hinge 16 is fixed on a slide 28, which can be moved lengthwise of the pathway 29. The pathway can be covered by a plate 30. The shifting of the curved plate 15 serves for varying the clear height of the chute, in order that bags of minor thickness can be pneumatically fully retarded by the pneumatic retarder.

Also, the vertical curved chute 12 enables a spacial form of pneumatic retarder to be used in which no closure diaphragm or the like is required for the plate. Referring to FIGS. 7 and 8, the plate 21 consists of a flexible substance, preferably resilient sheet steel. The plate 21 is so fitted into the curved end or reversal station of the chute 12 so as to extend in a plane transverse to the curvature of the chute and as to extend transversely through the space of the bend. The flexible plate 21 has its upper end secured at 22 to the top wall of the chute. Advantageously, the other end extends as far as the base surface or bottom wall 23 of the chute 12. The first-mentioned end of the plate 21 is rigidly secured by rivets or the like to a bent wall part 24. Conveniently, the transitional area between the part 24 and the bend 13 comprises a rounded part. The chute 12—i.e., the chute channel—has a cross-section of the kind shown in FIG. 2. The plate or sheet 21 extends over the whole width of the cross-section like, for instance, the plate 4 of FIG. 2.

A bag 11 or the like sliding down the chute is retarded both by the springing effect associated with the pressing of the sheet 21 into the bend 13, and also because the chamber 26 of the bend acts as an air cushion in just the same way as with the plate 4 of the embodiment shown in FIGS. 1–5. As the air is displaced from the chamber 26 and the sheet 21 engages with the bend 13, the cross-section of the chute channel 12 is cleared and the bag slides slowly, with retardation, through the bend 13 (FIG. 8). Once the bag 11 has left the bend 13, the sheet 21 returns to the extended position shown in FIG. 7. In the case of vertical curved chutes which are nested one inside another, the adjacent chute channel can be so placed that the bent wall part 24 does not extend into the chute channel above. Where specially designed spring sheets are provided, the fixing end can be bent slightly in the direction of the channel wall.

While there have herein been shown and described the preferred embodiments of the invention, it is nevertheless to be understood that minor changes may be made therein as will fall within the scope of the invention as claimed.

What is claimed is:

1. Means for retarding the movement and acceleration of bundles sliding on inclined tracks comprising an enclosed chute having top, bottom and side walls, the cross section of said chute being only slightly greater than that of the bundles, said bundle retarding means including a plurality of plates each of a width substantially equal to the width of the chute, means pivoting the end of each plate on the approach side of the bundles to a wall of said chute, a flexible air-impermeable member secured between the other end of said plate and the wall to which it is pivoted, forming an air chamber wholly contained within said chute wherein the air is automatically compressed by passage of a bundle through the chute against said plate, the space between the walls adjacent the sides of said plate and the edges of the plate forming relatively restricted openings for the relatively slow escape of air from the air chamber after passage of a bundle.

2. The structure of claim 1 wherein spring means are interposed between said plates and the wall to which said plates are pivoted normally biasing said plates away from said wall towards the center of said chute.

3. The structure of claim 2 wherein said chute is arranged in vertically zig-zag relation connected by arcuate portions, with said plates being disposed at the arcuate portions and being of a greater radius of curvature than the radius of curvative of said arcuate portions of the chute.

References Cited in the file of this patent

UNITED STATES PATENTS

| 499,075 | Winn | June 6, 1893 |
| 707,297 | Brink | Aug. 19, 1902 |
| 876,529 | Dorman | Jan. 14, 1908 |
| 1,879,944 | Muth | Sept. 27, 1932 |
| 2,306,955 | Karbusky | Dec. 29, 1942 |
| 2,647,670 | Cox | Aug. 4, 1953 |

FOREIGN PATENTS

| 368,014 | Great Britain | Mar. 3, 1932 |
| 370,203 | Great Britain | Apr. 7, 1932 |
| 1,066,492 | Germany | Oct. 1, 1959 |